March 20, 1945. A. E. RINEER 2,371,709
EXTRUSION MOLDING APPARATUS
Filed Sept. 19, 1941 3 Sheets-Sheet 2

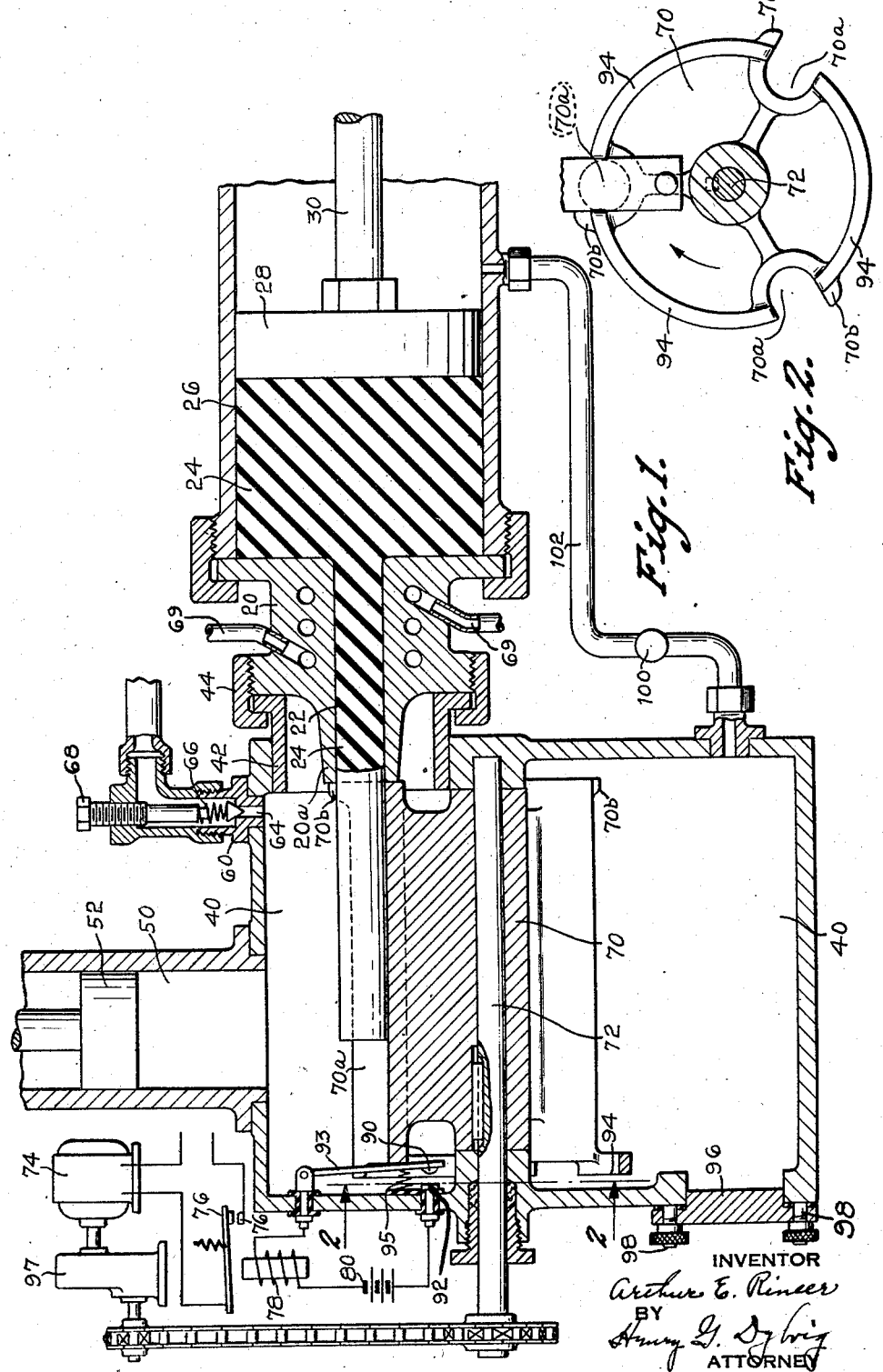

INVENTOR
Arthur E. Rineer
BY
Henry G. Dybvig
ATTORNEY

Patented Mar. 20, 1945

2,371,709

UNITED STATES PATENT OFFICE 2,371,709

EXTRUSION MOLDING APPARATUS

Arthur E. Rineer, Dayton, Ohio

Application September 19, 1941, Serial No. 411,513

1 Claim. (Cl. 18—12)

This invention relates to extrusion molding of plastic molding materials and more particularly to molding of articles having a uniform cross sectional area throughout the length.

In the molding of plastic molding materials requiring high molding pressures, it has not been possible to force the molding material through a die or mold continuously for the reason that it is not possible to exert sufficient pressure upon the molding material during the molding operation. That being the case, it has been necessary to use a closed mold for each molded article. This mold may be filled by the use of pellets or it may be filled by a suitable injector mechanism forcing the plastic molding material into the cavity of the mold. In some other arts, as for example, the wire making art, the metal is drawn out through a die. In the molding of aluminum bars, the resistance of the walls of the dies is sufficient to permit the necessary pressure being applied to properly extrude the aluminum bars. When it comes to plastic molding materials when several thousand pounds pressure per square inch is required during the molding operation, a drawing process similar to that used in the drawing of wire cannot be used. The extrusion process, wherein the walls of the mold resist the free flow of the metal until it solidifies cannot be used, for the reason that it is impossible to create sufficient back pressure so as to properly compress the plastic molding material during the forming operation.

An object of this invention is to mold plastic molding material forced through a die against a force supplied to the molded portion that has passed through the die.

Another object of this invention is to cause the molding material flowing through a die to flow into a fluid medium supplying a back pressure retarding the free flow of the molding material through the die.

Another object of this invention is to produce a hydraulic molding device wherein one wall of the die is hydraulically controlled.

Another object of this invention is to provide a hydraulic molding device including a hydraulically controlled wall for the die, wherein a differential of pressure is maintained between the pressure supplied to the fluid controlling the wall and the pressure supplied to the molding material.

Another object of this invention is to provide a hydraulic molding device including a die including a hydraulically controlled wall, wherein the pressure to the fluid controlling said wall is automatically controlled.

Another object of this invention is to provide a molding device for forming plastic molding materials into molded members having a uniform cross sectional area by the use of an apertured die.

Another object of this invention is to provide a hydraulic molding device for continuously extruding plastic molding material into a formation having a uniform cross sectional area.

Another object of this invention is to provide a continuous molding device for plastic molding material having embedded therein a core of non-plastic material.

Another object of this invention is to provide a molding device that is cheap, efficient and dependable.

Other objects and advantages reside in the construction of parts, the combination thereof and the mode of operation, as will become more apparent from the following description.

According to Pascal's law, the intensity of pressures in a liquid at rest is the same in all directions. Furthermore, the resultant pressure on any plane in a liquid at rest is normal to the surface. These two laws may be utilized in producing a mold or die for extruding plastic molding materials. This has been accomplished by supplying a fluid under pressure to the discharge orifice of the die or mold. This fluid supplies sufficient pressure to the plastic molding material discharged through the orifice, so as to resist the flow of the molding material. This permits sufficient pressure being supplied to the plastic molding material during the molding operation to mold articles under the required pressures. It is then merely necessary to control the relative pressures supplied to the plastic molding material and the pressure supplied to the fluid resisting the free flow of the plastic molding material through the die, thereby building up sufficient pressure to properly mold the plastic molding material.

In the drawings,

Figure 1 is a schematic cross sectional view disclosing the preferred embodiment of an extrusion molding device provided with means for resisting the free flow of molding material through a cavity in the mold.

Figure 2 is a cross sectional end view of a work supporting member, taken substantially on the line 2—2 of Figure 1.

Figure 3:
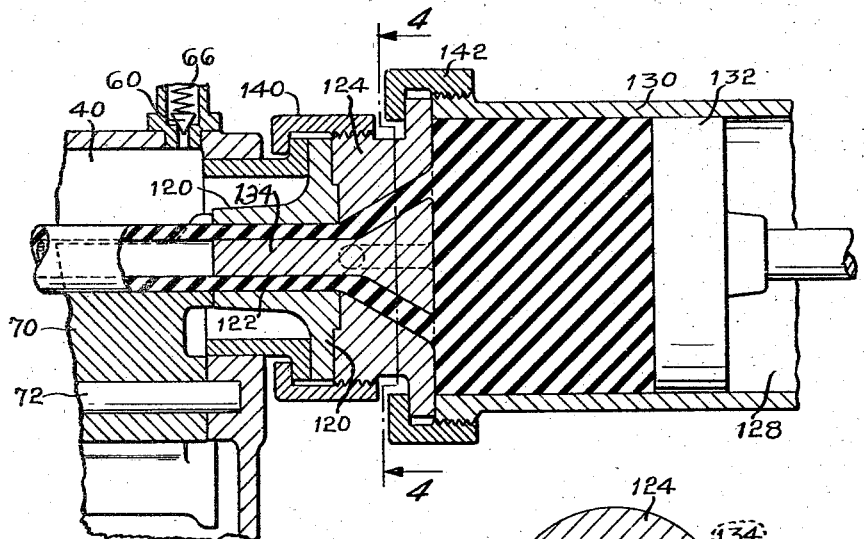
Figure 3 is a longitudinal cross sectional view of a modification disclosing a mold for molding a hollow member.
Figure 4:
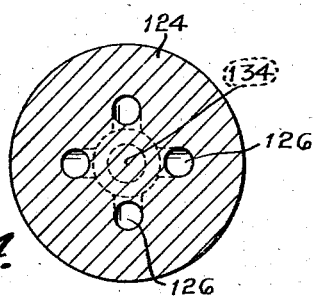
Figure 4 is a cross sectional view of the injector die taken substantially on the line 4—4 of Figure 3.

This device includes a magazine or a chamber for a supply of plastic molding material having means associated with the magazine for applying pressure to the plastic, which is extruded or forced through a cavity or a hole in the die against a fluid medium resisting the flow of the plastic molding material through the aperture, to thereby supply sufficient pressure to the plastic molding material to cause it to be molded. Heat may be supplied to the plastic molding material in the chamber if heat is required. The fluid medium into which the molding material projects as it flows from the die may be provided with a suitable release mechanism to release the pressure on the fluid when the pressure increases to the required pressure.

Referring to the drawings, the reference numeral 20 is used to designate a die or mold provided with a suitable aperture or cavity 22 having the desired shape, so that when plastic molding material 24 is forced through the aperture 22, the molding material has the desired cross sectional shape. A supply of molding material 24 is found in the cavity or magazine 26, which is provided with a cylindrical bore receiving a piston 28, preferably hydraulically driven through a piston rod 30 from a suitable source of hydraulic pressure, not shown. As the piston 28 is actuated towards the left, as viewed in Figure 1, it compresses the plastic molding material, so as to cause it to flow out through the aperture 22 in the die 20.

The plastic molding material, as it projects from the aperture in the die 20, extends into a reservoir 40, filled with a suitable hydraulic fluid under pressure. In the particular modification disclosed, the reservoir 40 is provided with a tubular extension 42, clamped to the die 20 by a screw threaded collar 44. Fluid is supplied to the reservoir 40 through a suitable cylinder 50, shown schematically, which is provided with a piston 52 actuated hydraulically in any suitable manner. A fluid medium fills the reservoir 40 and is maintained under pressure.

If a substantially incompressible fluid is used, as for example, oil, it is necessary to release the pressure on the fluid in the reservoir 40 in response to the molded plastic moving into the reservoir 40. This may be accomplished by a suitable release valve 60 overlying an aperture 64 and urged into closed position by a suitable spring 66. As the pressure in the reservoir 40 increases beyond a predetermined value, the spring 66 permits the plunger 62 to unseat itself, thereby permitting some of the fluid to escape from the reservoir 40. A tension screw 68 adjusts the tension of the spring 66 to cause the valve 60 to release at the desired pressure.

In the event it is necessary to cool the plastic molding material during the curing operation, the die 20 is preferably provided with a nozzle 20a projecting into the fluid from the reservoir 40. By this arrangement the nozzle 20a is cooled and thereby the heat in the plastic molding material is dissipated. Furthermore, the nozzle may be cooled by a suitable refrigerant flowing through the cooling pipes 69.

The plastic molding material, as it projects from the mold or die 20, may be supported upon a suitable support 70, rotatably mounted in the reservoir 40. The support 70 is provided with a plurality of longitudinal grooves 70a. In the particular modification disclosed, there are three such grooves. This support 70 is mounted for rotation upon a shaft 72 journalled in a suitable bearing projecting through the wall of the reservoir. This shaft is intermittently driven by an electric motor 74, energized from a suitable source of current whenever the contacts 76 are closed. The contacts 76 are closed by a relay 78 energized from a suitable source of energy, as for example, a battery 80, whenever the contacts 90 and 92 are closed. The contact 92 is fixed in position, the contact 90 being mounted upon a pivotally mounted lever 93 aligned in the path of the end of the molded article, so that as soon as the end of the molded article engages the lever 93, the circuit is closed through the relay 78, which causes the motor 74 to rotate the shaft 72 through one-third of a revolution.

The lever 93 is normally seated in a notched end of the support 70. When the motor 74 begins to rotate the support 70, and with it the molded article, cam surfaces 94 located on the end of the support 70 engage the lever 93 to hold the contact 90 in engagement with the contact 92 until the support 70 has rotated through a third of a revolution, when a spring 95 snaps the lever 93, and with it the contact 90, out of engagement with the contact 92. This occurs when the lever 93 is in registry with the succeeding groove 70a. The motor itself may rotate through several revolutions, the movement thereof being translated and reduced through a suitable gear mechanism 97. As the motor rotates the support 70, the knife edge 70b adjacent the end of the nozzle 20a severs the end of the plastic molding material. This severed end drops into the bottom of the reservoir. It is kept there until it is removed, preferably through a door 96 held in position by suitable clamping bolts 98. Obviously, the pressure in the fluid must be released in the reservoir when removing the molded articles.

In order to remove the pressure uniformly and simultaneously from the end of the bar and the fluid actuating the piston 28, the fluid in the reservoir 40 is interconnected to the fluid actuating the piston 28 by opening a valve 100 in a by-pass passage 102. By opening this valve 100, the pressure is released both in the reservoir and behind the piston 28 simultaneously, so that there is no danger of the piston 28 forcing plastic molding material into the reservoir and there is no danger of the back pressure of the fluid in the reservoir rushing into the chamber holding the plastic molding material in the event the pressure on the piston 28 should be released prior to the pressure in the reservoir. By interconnecting the two sources of fluid, the fluids are released in unison.

Immediately after the bar has been severed, a succeeding bar is projected into the succeeding groove of the support 70, which has been rotated into registry with the aperture during the movement of the motor. Obviously, as soon as the support 70 is rotated through one-third of a revolution, the pressure on the movable contact 90 is released, so as to cause the switches to open-circuit as soon as the motor has completed its cycle. Instead of electric controls, mechanical or hydraulic controls may be used.

Electrical, mechanical or hydraulic means may be used to arrest the movement of the piston 28 during the time that the support 70 moves, thereby temporarily stopping the extrusion process.

In the embodiment described above, the molded bars are solid. These may be round or any other cross sectional area, as for example, square, triangular or irregular shape, depending entirely upon the use to which the bars are to be put. Instead of solid bars, hollow bars may be molded. A die for molding hollow or tubular bars has been shown in Figure 3. This has been shown schematically and only the portion of the die or mold forming the tube has been shown. In this modification a die 120 is provided with an aperture 122 that registers with the outlet of a nozzle member 124 provided with a plurality of orifices 126, communicating with a chamber 128 in a cylinder 130, provided with a piston 132. Nozzle member 124 is provided with a core extension 134 projecting into the aperture 122 in the die 120. The molten plastic material is forced by the piston 132 through the orifices 126 into the cavity found between the die 120 and the core 134, which cavity may be tubular or have any other suitable hollow shape. The extruded molded portion projects into the reservoir 40, identical to the reservoir described in connection with the preferred embodiment shown in Figure 1. As the end of the extruded molded member hits the lever 93, the support is rotated so as to sever the molded article and advance another groove 70a into registry with the end of the orifice of the die 120. The fluid in the reservoir 40 flows into the hollow cavity of the molded article, so as to supply both an external and an internal pressure. The parts are held together in any suitable manner, as for example by the clamping nuts 140 and 142.

The spindle or core 134 need not necessarily be round. It may be any suitable configuration desired. It need not necessarily be centrally located. It may be positioned off center. Instead of one spindle or core, several cores may be used, so as to provide a hollow member having a number of holes. This modification lends itself to the manufacture of hollow articles of a great variety of shapes. For example, the cross sectional area may be tear-drop shaped, oval, polygonal, or any irregular shape, depending entirely upon the use to which the molded article may be put.

The aperture in the molded article may form a seat for a reenforcing core member that may be made from a plastic molding material or from some other material, as for example, a metallic material. This may be accomplished during the molding operation in the embodiments disclosed in Figures 5, 6 and 7.

Figure 5:
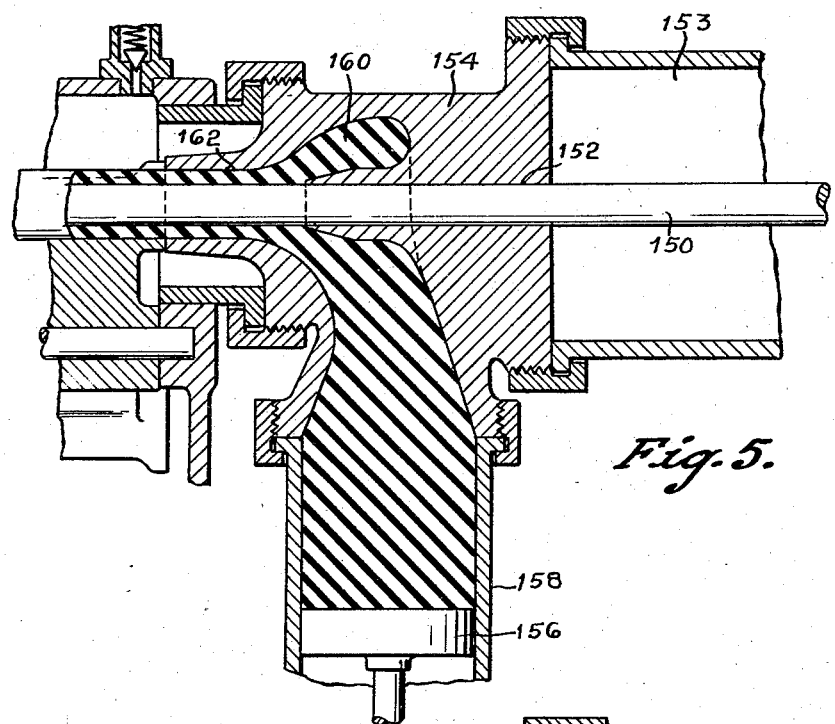
Figure 5 is a cross sectional view of a modification wherein a rod is embedded in the molding material.

In the modification disclosed in Figure 5, a core 150 is embedded in the molding material. This core may be a wire rod of copper, iron, steel or any other suitable metal or material. This core need not necessarily be centrally located. It may be positioned in any suitable place. This reenforcing core 150 is drawn through an aperture 152 in the die 154. Plastic molding material is forced into the die 154 by a ram 156, actuated in the cylindrical bore 158, having an outlet registering with an opening 160, communicating with a cavity 162 in the die 154. As the ram 156 forces the plastic through the opening 160 into the cavity 162, the plastic molding material draws the core 150 through the die, leaving a coating on the surface of the core 150. The chamber 153 is preferably filled with a fluid under pressure to equalize the pressure of the plastic molding material. The core 150, coated with a plastic coating or shell, advances into a reservoir 40, similar to the reservoir described in connection with the preferred embodiment in Figure 1.

Figure 6:
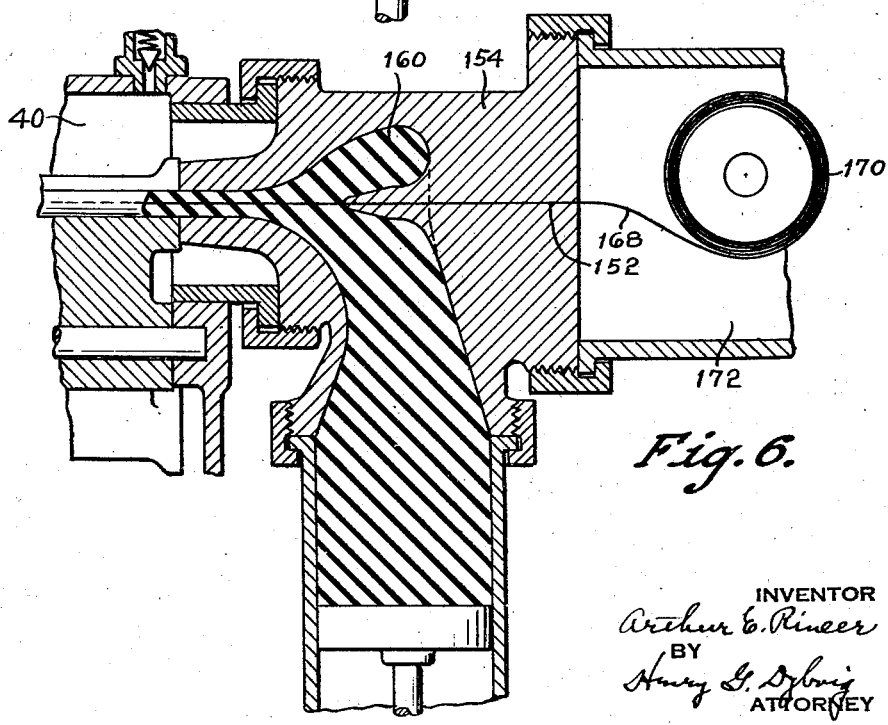
Figure 6 is another modification similar to Figure 5, showing a spool of wire mounted in position and adapted to be embedded in the molding material.

In the modification shown in Figure 6, a wire 168 is drawn from a spool 170 rotatably mounted in a compartment 172 that is filled with a suitable material preferably having a cementing nature, which may be referred to as a cementitious fluid under pressure. This cementitious fluid is subjected to the same pressure as the pressure in the reservoir 40, so that the pressures exerted by the cementitious fluid and the hydraulic fluid are equalized. Thus, there are no forces either to the right or to the left upon the wire 168 passing through the aperture 152, other than the pull caused by the plastic molding material flowing through the cavity 162 into the reservoir 40. The extraneous forces acting upon the embedded wire 168 are equalized, excepting the force exerted by the plastic molding material unwinding the embedded wire 168 from the reel or spool 170. In order to start the movement of the wire, the free end may be knotted or enlarged, so as to form an obstacle in the path of the plastic in the process of extrusion.

The wire 168, passing through the aperture 152, may have a thin coating of the cementious material adhering thereto. The maximum diameter of the core is substantially the same as the maximum diameter of aperture 152. The cementitious material adhering to the core as it enters the plastic bath may form a bond between the core and the surrounding sheet or coating of plastic material. Due to the high pressure supplied to the cementitious material and the fluid resisting the free flow of the molded portion through the aperture, the plastic molding material will not escape around the periphery of the core as it passes through the aperture 152 if a reasonably small clearance is provided between the core and the aperture 152.

Thus far only one type of molding material has been used. However, it is possible to provide a compound mold or a die that will mold two plastic molding materials simultaneously into a common member or rod. In the modification disclosed in Figure 7, a compound mold 200 has been shown. This mold is provided with a longitudinal bore 202 receiving plastic molding material from a source of supply 204, compressed by a ram 206 that is preferably hydraulically actuated. The bore 202 terminates in a nozzle-like structure 210, provided with tapering walls. This nozzle-like structure 210 is surrounded by an annular cavity 212 that receives plastic molding material from a source of supply 214 which is compressed by a ram 216 mounted for reciprocatory movement in a cylinder 218. The plastic 214 flows around the plastic rod 203 and is discharged through an orifice 220 into a suitable reservoir 40. This reservoir 40 is filled with hydraulic fluid resisting the free flow of the plastic molding material from the two sources, namely, 204 and 214. The pressure exerted upon the two rams 206 and 260 is preferably the same, so that the pressure applied to the two types of plastic molding material is identical.

Two types of plastic molding material, as used herein, may designate two dissimilar materials, or the two materials may be the same basic plastic molding material, the one having some type of ingredient so as to distinguish it from the other. One, for example, could be dyed, the other of a natural color. This may be desirable when producing articles for ornamentation. The extruded rod or molded member may project upon a suitable support, like that disclosed in Figure 1, in readiness to be severed to the desired length.

Figure 7:
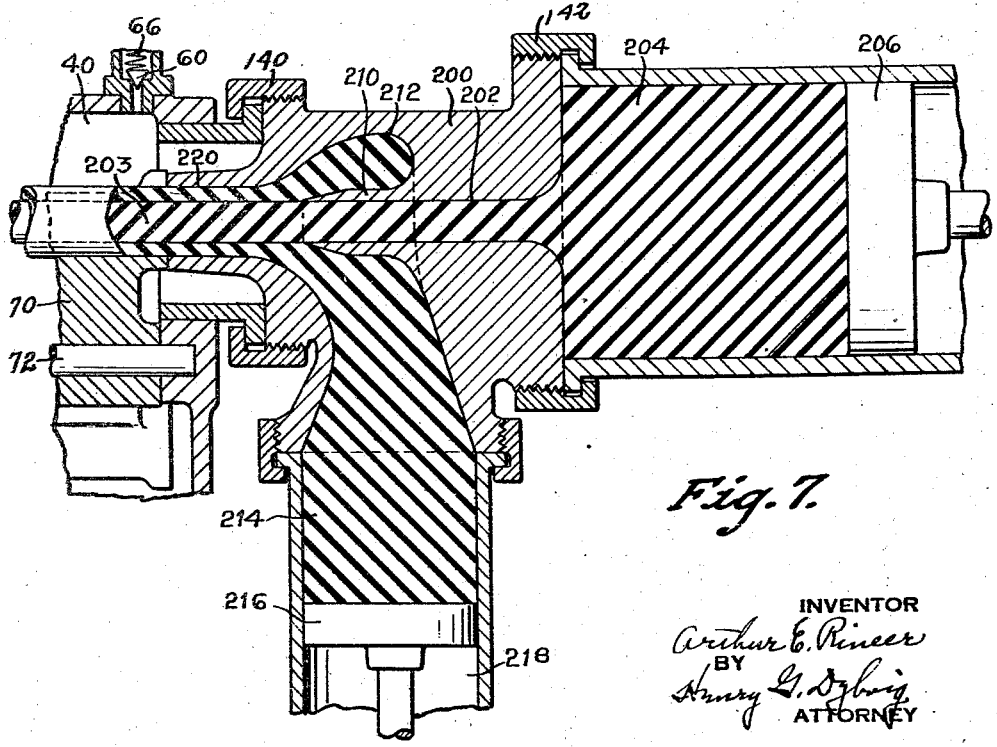
Figure 7 is another modification wherein two types of molding material are incorporated into the molded rod, wherein one type may be used as a core for the other.

The mold or die disclosed in Figure 7 is not limited to the use of the two types or kinds of molding materials. A multiplicity of types and kinds of molding materials may be used by merely extending the compound mold. This lends itself to the molding of various types of articles that may be ornamented to suit the needs, or dissimilar molding materials may be used, one of which may give strength and rigidity, the other some other desirable quality.

The molding devices disclosed herein have not been provided with any type of heating devices. Most molding materials are molded while hot, the temperature depending entirely upon the type of molding material used, as is well known to those skilled in the art. Within the purview of this invention a suitable heating device may be incorporated into each molding device disclosed herein.

The fluid used in creating a back pressure may be any suitable liquid or gas, depending entirely upon the nature of the molding material, the available equipment, et cetera.

The preferred embodiment and each of the modifications suggest the use of this process in connection with the molding of rods or tubes. This process, however, is not limited to the molding of rods and tubes. It may also be used to mold sheets, either by providing a wide orifice that has the desired thickness equal to the thickness of the sheets, or sheets may be produced by molding large tubes which are split longitudinally, so as to be flattened into a sheet.

Instead of using cooling pipes embedded in the nozzles of the dies, the oil or liquid in the reservoir 40 may be cooled by suitable cooling coils, not shown, thereby rapidly withdrawing the heat from the nozzle of the die and from the molding material as it emerges from the nozzle.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A device for continuously molding plastic molding material under pressure, said device including an apertured die, means for extruding the plastic molding material through the aperture in the die, said means including a cylinder having a piston driven by a hydraulic fluid, a reservoir containing hydraulic fluid communicating with the outlet of the die, means for compressing the fluid in the reservoir so as to resist the free flow of the plastic through said die, and interconnecting means for equalizing the pressure of the hydraulic fluid actuating the piston and the hydraulic fluid in the reservoir, said interconnecting means including a conduit having a valve for closing the passage through the conduit.

ARTHUR E. RINEER.